US00RE44936E

(19) United States
(12) Reissued Patent
St. John et al.

(10) Patent Number: US RE44,936 E
(45) Date of Reissued Patent: *Jun. 10, 2014

(54) ALDEHYDE-FUNCTIONALIZED POLYMERS

(75) Inventors: Michael R. St. John, Chicago, IL (US); Angela P. Zagala, Cary, NC (US)

(73) Assignee: Nalco Company, Naperville, IL (US)

( * ) Notice: This patent is subject to a terminal disclaimer.

(21) Appl. No.: 13/562,754

(22) Filed: Jul. 31, 2012

Related U.S. Patent Documents

Reissue of:
(64) Patent No.: 7,901,543
Issued: Mar. 8, 2011
Appl. No.: 12/636,932
Filed: Dec. 14, 2009

U.S. Applications:
(63) Continuation of application No. 10/764,935, filed on Jan. 26, 2004, now Pat. No. 7,641,766.

(51) Int. Cl.
*D21H 17/55* (2006.01)
*D21H 21/10* (2006.01)

(52) U.S. Cl.
USPC ..... 162/166; 162/158; 162/164.1; 162/168.3; 162/184; 162/185; 525/154; 525/329.4

(58) Field of Classification Search
USPC ..... 162/158, 164.6, 166, 168.1–168.3, 162/183–185; 525/154, 313, 328.2–328.3, 525/329.4
See application file for complete search history.

(56) References Cited

U.S. PATENT DOCUMENTS

| | | | | |
|---|---|---|---|---|
| 2,982,749 | A * | 5/1961 | Friedrich et al. | 526/207 |
| 3,284,393 | A * | 11/1966 | Vanderhoff et al. | 524/801 |
| 3,556,932 | A * | 1/1971 | Coscia et al. | 162/166 |
| 3,734,873 | A * | 5/1973 | Anderson et al. | 523/336 |
| 4,603,176 | A * | 7/1986 | Bjorkquist et al. | 525/329.4 |
| 4,605,702 | A * | 8/1986 | Guerro et al. | 525/154 |
| 4,919,821 | A * | 4/1990 | Fong et al. | 210/698 |
| 4,929,655 | A * | 5/1990 | Takeda et al. | 524/458 |
| 4,954,538 | A | 9/1990 | Dauplaise et al. | |
| 5,006,590 | A * | 4/1991 | Takeda et al. | 524/458 |
| 5,320,711 | A * | 6/1994 | Dauplaise et al. | 162/168.2 |
| 5,571,380 | A * | 11/1996 | Fallon | 162/168.2 |
| 5,597,858 | A * | 1/1997 | Ramesh et al. | 524/458 |
| 5,597,859 | A * | 1/1997 | Hurlock et al. | 524/458 |
| 5,605,970 | A * | 2/1997 | Selvarajan | 525/274 |
| 5,654,198 | A * | 8/1997 | Carrier et al. | 436/6 |
| 5,674,362 | A * | 10/1997 | Underwood et al. | 162/164.3 |
| 5,723,022 | A | 3/1998 | Dauplaise et al. | |
| 5,785,813 | A * | 7/1998 | Smith et al. | 162/158 |
| 5,837,776 | A * | 11/1998 | Selvarajan et al. | 525/244 |
| 5,985,992 | A * | 11/1999 | Chen | 524/814 |
| 6,013,708 | A * | 1/2000 | Mallon et al. | 524/156 |
| 6,077,394 | A * | 6/2000 | Spence et al. | 162/164.3 |
| 6,083,348 | A * | 7/2000 | Auhorn et al. | 162/183 |
| 6,176,972 | B1 * | 1/2001 | Oriaran et al. | 162/111 |
| 6,241,853 | B1 * | 6/2001 | Smith et al. | 162/141 |
| 6,315,866 | B1 * | 11/2001 | Sanchez | 162/168.2 |
| 6,426,383 | B1 * | 7/2002 | Fong et al. | 524/827 |
| 6,472,487 | B2 * | 10/2002 | Schroeder et al. | 526/263 |
| 6,610,209 | B1 * | 8/2003 | Sommese et al. | 210/705 |
| 7,641,766 | B2 * | 1/2010 | St. John et al. | 162/166 |
| 7,901,543 | B2 * | 3/2011 | St. John et al. | 162/166 |
| 2002/0134521 | A1 * | 9/2002 | Shannon et al. | 162/164.4 |
| 2004/0050514 | A1 * | 3/2004 | Shannon et al. | 162/158 |
| 2005/0187356 | A1 * | 8/2005 | Hagiopol et al. | 525/329.4 |
| 2013/0269892 | A1 | 10/2013 | Hermans et al. | |

FOREIGN PATENT DOCUMENTS

| | | | |
|---|---|---|---|
| EP | 183466 | B1 * | 8/1990 |
| EP | 657478 | A2 * | 6/1995 |
| EP | 657478 | A3 * | 7/1995 |
| EP | 183466 | B2 * | 8/1997 |
| EP | 630909 | B1 * | 10/1998 |

OTHER PUBLICATIONS

Hunkeler, et al., "Mechanism, Kinetics and Modeling of the Inverse-Microsuspension Homopolymerization of Acrylamide," Polymer, vol. 30(1), pp. 127 to 142 (1989).*
Hunkeler et al., "Mechanism, Kinetics and Modeling of Inverse-Microsuspension Polymerization: 2. Copolymerization of Acrylamide with Quaternary Ammonium Cationic Monomers," Polymer, vol. 32(14), pp. 2626 to 2640 (1991).*
Wet Strength Resins and Their Applications, Chapter 3, Glyoxalated Polyacrylamide Resin, L.L. Chan, TAPPI Press, pp. 45-61 (1994).*
Nalco Chemical Company, Research Analytical Competitor Product Analysis—Hercobond 1000 dated Feb. 25, 2002 (1 page).
Nalco Chemical Company, Research Analytical Competitor Product Analysis—Parez 631 NC dated Aug. 5, 1999 (20 pages).
Nalco Chemical Company, Ondeo-Nalco Technical Exchange—M. R. St. John dated Jun. 27, 2002 (5 pages).
Farley, C.E., "Glyoxalated polyacrylamide resin," in Wet Strength Resins and Their Application, ed. Lock L. Chan, Tappi Press, Atlanta, Georgia (1994), Ch. 3, 45-61.
Declaration of William Ford including Exhibits 1-5; Filed May 2, 2011—20 pages.
Declaration of Charles D. Lee including Exhibit 1; Filed May 2, 2011—7 pages.
Kemira Chemicals, Inc.'s Opposition to Nalco Company's Motion for Immediate Stay and Consent to a Time-Limited Stay; Filed May 2, 2011—6 pages.
Order Granting/Denying Nalco's Motion to Stay; Filed May 17, 2011—2 pages.
Reply in Support of Nalco Company's Motion to Dismiss with Exhibits A-C; Filed May 19, 2011—25 pages.
Kemira's Notice of Supplemental Authority; Filed May 23, 2011—6 pages.
Order Denying Nalco's Order to Dismiss; Filed Jun. 20, 2011—13 pages.

(Continued)

*Primary Examiner* — Dennis Cordray
(74) *Attorney, Agent, or Firm* — K&L Gates LLP

(57) ABSTRACT

A composition for enhancing the dewatering of a paper sheet on a paper machine and a method for using the composition is disclosed. The composition comprising one or more aldehyde-functionalized polymers comprising amino or amido groups wherein at least about 15 mole percent of the amino or amido groups are functionalized by reacting with one or more aldehydes and wherein the aldehyde functionalized polymers have a molecular weight of at least about 100,000. The method comprising adding the composition to the paper machine at a dosage of about 0.05 lb/ton to about 15 lb/ton, based on dry fiber.

50 Claims, No Drawings

(56) References Cited

OTHER PUBLICATIONS

Nalco Company's Answer and Counterclaims with Exhibit A; Filed Jul. 5, 2011—25 pages.
Answer of Kemira Chemicals, Inc. to Nalco Company's Counterclaims; Filed Jul. 28, 2011—6 pages.
Defendant's Initial Disclosures with Attachment A, B C, and E; Filed Aug. 12, 2011—10 pages.
Order administratively closing action; Filed Dec. 14, 2011—2 pages.
Stipulation of Dismissal; Filed Mar. 5, 2012—3 pages.
Complaint with Exhibits A-C; Filed Mar. 8, 2011—48 pages.
Nalco Company's Motion to Dismiss and Memorandum in Support of Nalco's Motion to Dismiss with Exhibits A-C; Filed Apr. 14, 2011—37 pages.
Nalco Company's Motion for Immediate Stay and Nalco's Memorandum in Support of Nalco Company's Motion for Immediate Stay; Filed Apr. 14, 2011—11 pages.
Kemira Chemical's Inc.'s Opposition to Nalco Company's Motion to Dismiss—23 pages, 2011.
Exhibit 4—U.S. Patent No. 7,901,543 Anticipation and/or Obviousness—19 pages.
Plaintiffs Disclosure of Invalidity Contentions—19 pages, 2011.
Exhibit 1—U.S. Patent No. 7,641,766 Anticipation and/or Obviousness—31 pages.
Exhibit 2—U.S. Patent No. 7,901,543 Anticipation and/or Obviousness—64 pages.
Exhibit 3—U.S. Patent No. 7,641,766 Anticipation and/or Obviousness—12 pages.

* cited by examiner

ALDEHYDE-FUNCTIONALIZED POLYMERS

Matter enclosed in heavy brackets [ ] appears in the original patent but forms no part of this reissue specification; matter printed in italics indicates the additions made by reissue.

CROSS-REFERENCE TO RELATED APPLICATION

This is a continuation application of U.S. patent application Ser. No. 10/764,935, "Method of Using Aldehyde-Functionalized Polymers to Enhance Paper Machine Dewatering," filed on Jan. 26, 2004, now U.S. Pat. No. 7,641,766, which is incorporated herein by reference in its entirety.

TECHNICAL FIELD

This invention relates to a novel composition for enhancing paper machine dewatering and a method of using the composition. More specifically, the invention relates to aldehyde-functionalized polymers having a specific level of functionalization.

BACKGROUND OF THE INVENTION

Papermaking comprises taking a slurry of papermaking raw materials at a consistency (weight percent solids) in the range 0.1 to 1.0 weight percent and dewatering it to form a sheet with a final consistency of about 95 weight percent. Paper machines accomplish this dewatering through a series of different processes which include from the beginning to end: 1) gravity or inertial dewatering (early forming section of the machine); 2) vacuum dewatering (late forming section of the machine); 3) press dewatering (press section of the machine); and 4) thermally evaporating the water (dryer section of the machine). The cost of dewatering increases in going from 1 to 4, which makes it advantageous to remove as much water as possible in the earlier stages. The rate of paper production or, equivalently, the machine speed is dictated by the rate at which the water can be removed, and consequently, any chemical treatment which can increase the rate of water removal has value for the papermaker. Many grades of paper require the use of retention aid chemicals for their manufacture in order to retain the fine particles found in the raw materials used to make the paper. It is well known in the paper industry that these retention aids can also enhance the rate of gravity, inertial, and vacuum dewatering or drainage, as it is often called. Such retention chemicals include the well known flocculants, coagulants, and microparticles used in the industry. Existing laboratory free and vacuum drainage tests can readily identify the drainage effects of these retention aid chemicals.

The production rate for the vast majority of paper machines is limited by the drying capacity of the machine's dryer section. Consequently, the consistency of the paper sheet leaving the press section and going into the dryer section is most often critical in determining the paper machine speed or production rate. The effects of chemical additives on press dewatering are unclear with little information available on this topic. The effect of retention aid chemicals on press dewatering is often reported to be detrimental as a consequence of the decreased consistency entering the press as a result of increased water retention or reduction in press efficiency resulting from a loss in sheet formation. Both these factors arise from the flocculation of the papermaking particles by the retention chemicals. Because the consistency of the sheet leaving the press section is most often the most critical factor in determining machine speed, any treatment capable of increasing this consistency would obviously be highly desirable. Currently, no chemical treatments are known to be marketed as commercial press dewatering aids, although anecdotal reports suggest that some polymers can favorably effect out going press consistency. Accordingly, there is an ongoing need to develop compositions having effective press dewatering activity.

Glyoxylated polyvinylamides prepared from glyoxal and polyvinylamide in a mole ratio of 0.1 to 0.2 are disclosed as wet strength resins in U.S. Pat. No. 3,556,932.

Low molecular weight glyoxylated cationic polyacrylamides prepared from glyoxal and cationic polyvinylamide in a ratio of 0.1-0.5:1 are disclosed as temporary wet strength resins in U.S. Pat. No. 4,605,702.

A method of imparting strength to paper by adding to a pulp slurry a mixed resin comprising an aminopolyamide-epichlorohydrin resin and a glyoxylated acrylamide-dimethyl diallyl ammonium chloride resin prepared from glyoxal and acrylamide-dimethyl diallyl ammonium chloride copolymer in a molar ratio of about 2-0.5:1 is disclosed in U.S. Pat. No. 5,674,362.

SUMMARY OF THE INVENTION

This invention is a method of enhancing the dewatering of a paper sheet on a paper machine comprising adding to the paper sheet about 0.05 lb/ton to about 15 lb/ton, based on dry fiber, of one or more aldehyde functionalized polymers comprising amino or amido groups wherein at least about 15 mole percent of the amino or amido groups are functionalized by reacting with one or more aldehydes and wherein the aldehyde functionalized polymers have a weight average molecular weight of at least about 100,000 g/mole.

DETAILED DESCRIPTION OF THE INVENTION

"Acrylamide monomer" means a monomer of formula

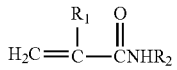

wherein $R_1$ is H or $C_1$-$C_4$ alkyl and $R_2$ is H, $C_1$-$C_4$ alkyl, aryl or arylalkyl. Preferred acrylamide monomers are acrylamide and methacrylamide. Acrylamide is more preferred.

"Aldehyde" means a compound containing one or more aldehyde (—CHO) groups, where the aldehyde groups are capable of reacting with the amino or amido groups of a polymer comprising amino or amido groups as described herein. Representative aldehydes include formaldehyde, paraformaldehyde, glutaraldehyde, glyoxal, and the like. Glyoxal is preferred.

"Alkyl" means a monovalent group derived from a straight or branched chain saturated hydrocarbon by the removal of a single hydrogen atom. Representative alkyl groups include methyl, ethyl, n- and iso-propyl, cetyl, and the like.

"Alkylene" means a divalent group derived from a straight or branched chain saturated hydrocarbon by the removal of two hydrogen atoms. Representative alkylene groups include methylene, ethylene, propylene, and the like.

"Amido group" means a group of formula —$C(O)NHY_1$ where $Y_1$ is selected from H, alkyl, aryl and arylalkyl.

"Amino group" means a group of formula —$NHY_2$ where $Y_2$ is selected from H, alkyl, aryl and arylalkyl.

"Amphoteric" means a polymer derived from both cationic monomers and anionic monomers, and, possibly, other non-ionic monomer(s). Representative amphoteric polymers include copolymers composed of acrylic acid and DMAEA.MCQ, terpolymers composed of acrylic acid, DADMAC and acrylamide, and the like.

"Aryl" means an aromatic monocyclic or multicyclic ring system of about 6 to about 10 carbon atoms. The aryl is optionally substituted with one or more $C_1$-$C_{20}$ alkyl, alkoxy or haloalkyl groups. Representative aryl groups include phenyl or naphthyl, or substituted phenyl or substituted naphthyl.

"Arylalkyl" means an aryl-alkylene-group where aryl and alkylene are defined herein. Representative arylalkyl groups include benzyl, phenylethyl, phenylpropyl, 1-naphthylmethyl, and the like. Benzyl is preferred.

"Diallyl-N,N-disubstituted ammonium halide monomer" means a monomer of formula $$(H_2C{=}CHCH_2)_2N^+R_3R_4X^-$$

wherein $R_3$ and $R_4$ are independently $C_1$-$C_{20}$ alkyl, aryl or arylalkyl and X is an anionic counterion. Representative anionic counterions include halogen, sulfate, nitrate, phosphate, and the like. A preferred anionic counterion is halogen. Halogen is preferred. A preferred diallyl-N,N-disubstituted ammonium halide monomer is diallyldimethylammonium chloride.

"Halogen" means fluorine, chlorine, bromine or iodine.

"Monomer" means a polymerizable allylic, vinylic or acrylic compound. The monomer may be anionic, cationic, nonionic or zwitterionic. Vinyl monomers are preferred, acrylic monomers are more preferred.

Representative non-ionic, water-soluble monomers include acrylamide, methacrylamide, N,N-dimethylacetylamide, N,N-diethylacrylamide, N-isopropylacrylamide, N-vinylformamide, N-vinylmethylacetamide, N-vinyl pyrrolidone, hydroxyethyl methacrylate, hydroxyethyl acrylate, hydroxypropyl acrylate, hydroxypropyl methacrylate, N-t-butylacrylamide, N-methylolacrylamide, vinyl acetate, vinyl alcohol, and the like.

Representative anionic monomers include acrylic acid, and its salts, including, but not limited to sodium acrylate, and ammonium acrylate, methacrylic acid, and its salts, including, but not limited to sodium methacrylate, and ammonium methacrylate, 2-acrylamido-2-methylpropanesulfonic acid (AMPS), the sodium salt of AMPS, sodium vinyl sulfonate, styrene sulfonate, maleic acid, and its salts, including, but not limited to the sodium salt, and ammonium salt, sulfonate, itaconate, sulfopropyl acrylate or methacrylate or other water-soluble forms of these or other polymerisable carboxylic or sulphonic acids. Sulfomethylated acrylamide, allyl sulfonate, sodium vinyl sulfonate, itaconic acid, acrylamidomethylbutanoic acid, fumaric acid, vinylphosphonic acid, vinylsulfonic acid, allylphosphonic acid, sulfomethylated acrylamide, phosphonomethylated acrylamide, itaconic anhydride, and the like.

Representative cationic monomers include allyl amine, vinyl amine, dialkylaminoalkyl acrylates and methacrylates and their quaternary or acid salts, including, but not limited to, dimethylaminoethyl acrylate methyl chloride quaternary salt (DMAEA.MCQ), dimethylaminoethyl acrylate methyl sulfate quaternary salt, dimethyaminoethyl acrylate benzyl chloride quaternary salt, dimethylaminoethyl acrylate sulfuric acid salt, dimethylaminoethyl acrylate hydrochloric acid salt, dimethylaminoethyl methacrylate methyl chloride quaternary salt, dimethylaminoethyl methacrylate methyl sulfate quaternary salt, dimethylaminoethyl methacrylate benzyl chloride quaternary salt, dimethylaminoethyl methacrylate sulfuric acid salt, dimethylaminoethyl methacrylate hydrochloric acid salt, dialkylaminoalkylacrylamides or methacrylamides and their quaternary or acid salts such as acrylamidopropyltrimethylammonium chloride, dimethylaminopropyl acrylamide methyl sulfate quaternary salt, dimethylaminopropyl acrylamide sulfuric acid salt, dimethylaminopropyl acrylamide hydrochloric acid salt, methacrylamidopropyltrimethylammonium chloride, dimethylaminopropyl methacrylamide methyl sulfate quaternary salt, dimethylaminopropyl methacrylamide sulfuric acid salt, dimethylaminopropyl methacrylamide hydrochloric acid salt, diethylaminoethylacrylate, diethylaminoethylmethacrylate, diallyldiethylammonium chloride and diallyldimethyl ammonium chloride (DADMAC). Alkyl groups are generally $C_{1-4}$ alkyl.

"Zwitterionic monomer" means a polymerizable molecule containing cationic and anionic (charged) functionality in equal proportions, so that the molecule is net neutral overall. Representative zwitterionic monomers include N,N-dimethyl-N-acryloyloxyethyl-N-(3-sulfopropyl)-ammonium betaine, N,N-dimethyl-N-acrylamidopropyl-N-(2-carboxymethyl)-ammonium betaine, N,N-dimethyl-N-acrylamidopropyl-N-(3-sulfopropyl)-ammonium betaine, N,N-dimethyl-N-acrylamidopropyl-N-(2-carboxymethyl)-ammonium betaine, 2-(methylthio)ethyl methacryloyl-S-(sulfopropyl)-sulfonium betaine, 2-[(2-acryloylethyl) dimethylammonio]ethyl 2-methyl phosphate, 2-(acryloyloxyethyl)-2'-(trimethylammonium)ethyl phosphate, [(2-acryloylethyl)dimethylammonio]methyl phosphonic acid, 2-methacryloyloxyethyl phosphorylcholine (MPC), 2-[(3-acrylamidopropyl)dimethylammonio]ethyl 2'-isopropyl phosphate (AAPI), 1-vinyl-3-(3-sulfopropyl)imidazolium hydroxide, (2-acryloxyethyl) carboxymethyl methylsulfonium chloride, 1-(3-sulfopropyl)-2-vinylpyridinium betaine, N-(4-sulfobutyl)-N-methyl-N,N-diallylamine ammonium betaine (MDABS), N,N-diallyl-N-methyl-N-(2-sulfoethyl) ammonium betaine, and the like.

"Papermaking process" means a method of making paper products from pulp comprising forming an aqueous cellulosic papermaking furnish, draining the furnish to form a sheet and drying the sheet. The steps of forming the papermaking furnish, draining and drying may be carried out in any conventional manner generally known to those skilled in the art. Conventional microparticles, alum, cationic starch or a combination thereof may be utilized as adjuncts with the polymer treatment of this invention, though it must be emphasized that no adjunct is required for effective dewatering activity.

Preferred Embodiments

The aldehyde-functionalized polymers according to this invention are prepared by reacting a polymer comprising amino or amido groups with one or more aldehydes. The polymer comprising amino or amide groups can have various architectures including linear, branched, star, block, graft, dendrimer, and the like.

Preferred polymers comprising amino or amido groups include polyamines and polyamides. The polyamides and polyamides may be prepared by copolymerizing monomers under free radical forming conditions using any number of techniques including emulsion polymerization, dispersion polymerization and solution polymerization.

Polyamines may also be prepared by modification of a pre-formed polyamide, for example by hydrolysis of acrylamide-vinylformamide copolymer using acid or base as described in U.S. Pat. Nos. 6,610,209 and 6,426,383.

Polyaminoamides may also be prepared by direct amidation of polyalkyl carboxylic acids and transamidation of copolymers containing carboxylic acid and (meth)acrylamide units as described in U.S. Pat. No. 4,919,821.

"Emulsion polymer" and "latex polymer" mean a polymer emulsion comprising an aldehyde-functionalized polymer according to this invention in the aqueous phase, a hydrocarbon oil for the oil phase and a water-in-oil emulsifying agent. Inverse emulsion polymers are hydrocarbon continuous with the water-soluble polymers dispersed within the hydrocarbon matrix. The inverse emulsion polymers are then "inverted" or activated for use by releasing the polymer from the particles using shear, dilution, and, generally, another surfactant. See U.S. Pat. No. 3,734,873, incorporated herein by reference. Representative preparations of high molecular weight inverse emulsion polymers are described in U.S. Pat. Nos. 2,982,749; 3,284,393; and 3,734,873. See also, Hunkeler, et al., "Mechanism, Kinetics and Modeling of the Inverse-Microsuspension Homopolymerization of Acrylamide," Polymer, vol. 30(1), pp 127-42 (1989); and Hunkeler et al., "Mechanism, Kinetics and Modeling of Inverse-Microsuspension Polymerization: 2. Copolymerization of Acrylamide with Quaternary Ammonium Cationic Monomers," Polymer, vol. 32(14), pp 2626-40 (1991).

The aqueous phase is prepared by mixing together in water one or more water-soluble monomers, and any polymerization additives such as inorganic salts, chelants, pH buffers, and the like.

The oil phase is prepared by mixing together an inert hydrocarbon liquid with one or more oil soluble surfactants. The surfactant mixture should have a low hydrophilic-lypophilic balance (HLB), to ensure the formation of an oil continuous emulsion. Appropriate surfactants for water-in-oil emulsion polymerizations, which are commercially available, are compiled in the North American Edition of McCutcheon's Emulsifiers & Detergents. The oil phase may need to be heated to ensure the formation of a homogeneous oil solution.

The oil phase is then charged into a reactor equipped with a mixer, a thermocouple, a nitrogen purge tube, and a condenser. The aqueous phase is added to the reactor containing the oil phase with vigorous stirring to form an emulsion. The resulting emulsion is heated to the desired temperature, purged with nitrogen, and a free-radical initiator is added. The reaction mixture is stirred for several hours under a nitrogen atmosphere at the desired temperature. Upon completion of the reaction, the water-in-oil emulsion polymer is cooled to room temperature, where any desired post-polymerization additives, such as antioxidants, or a high HLB surfactant (as described in U.S. Pat. No. 3,734,873) may be added.

The resulting emulsion polymer is a free-flowing liquid. An aqueous solution of the water-in-oil emulsion polymer can be generated by adding a desired amount of the emulsion polymer to water with vigorous mixing in the presence of a high-HLB surfactant (as described in U.S. Pat. No. 3,734,873).

"Dispersion polymer" polymer means a water-soluble polymer dispersed in an aqueous continuous phase containing one or more organic or inorganic salts and/or one or more aqueous polymers. Representative examples of dispersion polymerization of water-soluble polymers in an aqueous continuous phase can be found in U.S. Pat. Nos. 5,605,970; 5,837,776; 5,985,992; 4,929,655; 5,006,590; 5,597,859; and 5,597,858 and in European Patent Nos. 183,466; 657,478; and 630,909.

In a typical procedure for preparing a dispersion polymer, an aqueous solution containing one or more inorganic or organic salts, one or more water-soluble monomers, any polymerization additives such as processing aids, chelants, pH buffers and a water-soluble stabilizer polymer is charged to a reactor equipped with a mixer, a thermocouple, a nitrogen purging tube, and a water condenser. The monomer solution is mixed vigorously, heated to the desired temperature, and then a free radical initiator is added. The solution is purged with nitrogen while maintaining temperature and mixing for several hours. After this time, the mixture is cooled to room temperature, and any post-polymerization additives are charged to the reactor. Water continuous dispersions of water-soluble polymers are free flowing liquids with product viscosities generally 100-10,000 cP, measured at low shear.

In a typical procedure for preparing solution polymers, an aqueous solution containing one or more water-soluble monomers and any additional polymerization additives such as chelants, pH buffers, and the like, is prepared. This mixture is charged to a reactor equipped with a mixer, a thermocouple, a nitrogen purging tube and a water condenser. The solution is mixed vigorously, heated to the desired temperature, and then one or more free radical polymerization initiators are added. The solution is purged with nitrogen while maintaining temperature and mixing for several hours. Typically, the viscosity of the solution increases during this period. After the polymerization is complete, the reactor contents are cooled to room temperature and then transferred to storage. Solution polymer viscosities vary widely, and are dependent upon the concentration and molecular weight of the active polymer component.

The polymerization reactions are initiated by any means which results in generation of a suitable free-radical. Thermally derived radicals, in which the radical species results from thermal, homolytic dissociation of an azo, peroxide, hydroperoxide and perester compound are preferred. Especially preferred initiators are azo compounds including 2,2'-azobis(2-amidinopropane) dihydrochloride, 2,2'-azobis[2-(2-imidazolin-2-yl)propane]dihydrochloride, 2,2'-azobis (isobutyronitrile) (AIBN), 2,2'-azobis(2,4-dimethylvaleronitrile) (AIVN), and the like.

The polymerization processes can be carried out as a batch process or in steps. In a batch process, all of the reactive monomers are reacted together, whereas in a step or semi-batch process, a portion of the reactive monomer is withheld from the main reaction and added over time to affect the compositional drift of the copolymer or the formation of the dispersion particles.

The polymerization and/or post polymerization reaction conditions are selected such that the resulting polymer comprising amino or amido groups has a molecular weight of at least about 1,000 g/mole, preferably about 2,000 to about 10,000,000 g/mole.

The polymer comprising amino or amido groups is then functionalized by reaction with one or more aldehydes. Suitable aldehydes include any compound containing at least one aldehyde (—CHO) functional group having sufficient reactivity to react with the amino or amido groups of the polymer. Representative aldehydes include formaldehyde, paraformaldehyde, glutaraldehyde, glyoxal, and the like. Glyoxal is preferred.

The aldehyde-functionalized polymer is prepared by reacting the polyamide or polyamine with aldehyde at a pH between 4 to 12. The total concentration of polymer backbone plus aldehyde is between about 5 to about 35 weight percent. Generally, an aqueous solution of the polymer backbone is prepared for better reaction rate control and increased product stability. The pH of the aqueous polymer backbone solution is increased to between about 4 to about 12. The reaction temperature is generally about 20 to about 80° C. preferably about 20 to about 40° C. An aqueous aldehyde solution is added to the aqueous polymer backbone solution with good mixing to prevent gel formation. After the addition of aldehyde the pH is adjusted to about 4 to about 12 to achieve the desired reaction rate. After the adjustment of the pH generally the amount of monoreacted amide/amine is optimum for the given ratio of aldehyde to amide/amine and the amount of direacted amide/amine is low. The rate of viscosity increase is monitored during the reaction using a Brookfield viscometer. A viscosity increase of 0.5 cps indicates an increase in polymer molecular weight and an increase in the amount of direacted amide/amine. The amount of monoreacted amide/amine is generally maintained during the viscosity increase but the amount of direacted amide/amine increases with viscosity. Generally, the desired viscosity increase corresponds to a desired level of monoreacted amide/amine, direacted amide/amine and molecular weight. The rate of reaction depends on the temperature, total concentration of polymer and aldehyde, the ratio of aldehyde to amide/amine functional groups and pH. Higher rates of glyoxylation are expected when the temperature, total concentration of polymer and aldehyde, the ratio of aldehyde to amide/amine functional groups or pH is increased. The rate of reaction can be slowed down by decreasing the total concentration of polymer and aldehyde, temperature, the ratio of aldehyde to amide/amine functional groups or pH (to between about 2 to about 3.5). The amount of unreacted aldehyde at the end of the reaction increases as the ratio of aldehyde to amide/amine functional groups is increased. However, the total amount of monoreacted and direacted amide/amine becomes larger.

For example, reaction of a 95/5 mole percent diallyldimethylammonium chloride/acrylamide copolymer with glyoxal in a molar ratio of 0.4 to 1 glyoxal to acrylamide results in a 95/5 mole percent acrylamide/DADMAC copolymer with about 15 to 23 mole percent monoreacted and direacted acrylamide and with about 60 to 70 mole percent total unreacted glyoxal at the target product viscosity and molecular weight. A molar ratio of 0.8 to 1 glyoxal to acrylamide results in a 95/5 mole percent acrylamide/DADMAC copolymer with about 22 to 30 mole percent monoreacted and direacted acrylamide and with about 70 to 80 mole percent total unreacted glyoxal at the target product viscosity and molecular weight.

The product shelf stability depends on the storage temperature, product viscosity, total amount of reacted amide/amine, total concentration of polymer and aldehyde, the ratio of aldehyde to amide/amine functional groups and pH. Generally, the pH of the product is maintained at a low pH (2 to 3.5) and the total concentration of polymer and aldehyde is optimized to extend shelf stability.

The reaction conditions are selected such that at least about 15 mole percent, preferably at least about 20 mole percent of the amino or amido groups in the polymer react with the aldehyde to form the aldehyde-functionalized polymer. The resulting aldehyde-functionalized polymers have a weight average molecular weight of at least about 100,000 g/mole, preferably at least about 300,000 g/mole.

In a preferred aspect of this invention, the aldehyde functionalized polymer is an aldehyde functionalized polyamide.

In another preferred aspect, the aldehyde functionalized polyamide is an aldehyde-functionalized polymer comprising 100 mole percent of one or more nonionic monomers.

In another preferred aspect, the aldehyde functionalized polyamide is an aldehyde functionalized copolymer comprising about 5 to about 99 mole percent of one or more acrylamide monomers and about 95 mole percent to about 1 mole percent of one or more cationic, anionic or zwitterionic monomers, or a mixture thereof.

Copolymers prepared from nonionic monomers and cationic monomers preferably have a cationic charge of about 1 to about 50 mole percent, more preferably from about 1 to about 30 mole percent.

Copolymers prepared from nonionic monomers and anionic monomers preferably, have an anionic charge of about 1 to about 50 mole percent, more preferably from about 1 to about 30 mole percent.

Amphoteric polymers preferably have an overall positive charge. Preferred amphoteric polymers are composed of up to about 40 mole percent cationic monomers and up to about 20 mole percent anionic monomers. More preferred amphoteric polymers comprise about 5 to about 10 mole percent cationic monomers and about 0.5 to about 4 mole percent anionic monomers.

Zwitterionic polymers preferably comprise 1 to about 95 mole percent, preferably 1 to about 50 mole percent zwitterionic monomers.

In a preferred aspect of this invention the aldehyde-functionalized polyamide is an aldehyde functionalized copolymer comprising about 1 to about 99 mole percent of one or more acrylamide monomers and about 99 mole percent to about 1 mole percent of one or more cationic, anionic or zwitterionic monomers, or a mixture thereof.

In another preferred aspect, the aldehyde functionalized polyamide is an aldehyde functionalized copolymer comprising about 50 to about 99 mole percent of one or more acrylamide monomers and about 50 to about 1 mole percent of one or more cationic monomers.

In another preferred aspect, the aldehyde functionalized polymer is a copolymer comprising about 50 to about 99 mole percent of one or more acrylamide monomers and about 50 to about 1 mole percent of one or more cationic monomers wherein the copolymer is functionalized with glyoxal.

In another preferred aspect, the cationic monomer is a diallyl-N,N-disubstituted ammonium halide monomer.

In another preferred aspect, about 20 to about 50 mole percent of the amide groups of the copolymer have reacted with glyoxal.

In another preferred aspect, the nonionic monomer is acrylamide and the diallyl-N,N-disubstituted ammonium halide monomer is diallyldimethylammonium chloride.

In another preferred aspect, the functionalized polymer is a copolymer comprising about 70 to about 99 mole percent of acrylamide and about 1 to about 30 mole percent of diallyldimethylammonium chloride functionalized with glyoxal.

In another preferred aspect, about 20 to about 26 mole percent of the amide groups of the copolymer have reacted with glyoxal.

The aldehyde-functionalized polymers are useful for dewatering all grades of paper and paperboard with board grades and fine paper grades being preferred. Recycle board grades using OCC (old corrugated containers) with or without mixed waste have been particularly responsive.

Useful increases in dewatering can be achieved with aldehyde-functionalized polymer doses in the range 0.05 to 15.0 lb polymer/ton of dry fiber with best results normally achieved in the range 0.5 to 3.0 lb/ton depending on the particular papermaking circumstances (papermachine equipment and papermaking raw materials used).

The aldehyde functionalized polymers of the invention can be added in traditional wet end locations used for conventional wet end additives. These include to thin stock or thick stock. The actual wet end location is not considered to be critical, but the aldehyde-functionalized polymers are preferably added prior to the addition of other cationic additives. Because the aldehyde-functionalized polymers are believed to act as pressing aids, their addition to the wet end is not necessary, and the option of adding them just prior to the press section after the formation of the sheet can also be practiced. For example, the polymer can be sprayed on the wet web prior to entering the press section, and this can be a preferred mode of addition to reduce dosages or the effects of interferences which might occur in the wet end. Other traditional wet end additives can be used in combination with the aldehyde functionalized polymers. These include retention aids, strength additives such as starches, sizing agents, and the like.

When using aldehyde-functionalized polymers as described herein having net anionic charge, a method of fixing the polymer to the fiber is needed. This fixing is typically accomplished by using cationic materials in conjunction with the polymers. Such cationic materials are most frequently coagulants, either inorganic (e.g. alum, polyaluminum chlorides, iron chloride or sulfate, and any other cationic hydrolyzing salt) or organic (e.g. p-DADMACs, EPI/DMAs, PEIs, modified PEIs or any other high charged density low to medium molecular weight polymers). Additionally, cationic materials added for other purposes like starch, wet strength, or retention additives can also serve to fix the anionic polymer. No additional additives are needed to fix cationic aldehyde-functionalized polymers to the filler.

The foregoing may be better understood by reference to the following examples, which are presented for purposes of illustration and are not intended to limit the scope of the invention.

Example 1

Preparation of 95/5 Mole % Acrylamide/DADMAC Copolymer

To a 1500-mL reaction flask fitted with a mechanical stirrer, thermocouple, condenser, nitrogen purge tube, and addition port is added 116.4 g of deionized or soft water, 26.3 g of phosphoric acid, 63.8 g of a 62% aqueous solution of diallyldimethyl ammonium chloride (Nalco Company, Naperville, Ill.), 7.6 g of sodium formate, and 0.09 g of ethylenediaminetetraacetic acid, tetra sodium salt. The reaction mixture is stirred at 400 rpm and the pH adjusted to 4.7 to 4.9 using 17.3 g of aqueous 50% sodium hydroxide solution. The resulting mixture is heated to 100° C. and purged with nitrogen at 50 mL/min. Upon reaching 100° C., 17.6 g of a 25.0% aqueous solution of ammonium persulfate is added to the reaction mixture over a period of 135 minutes. Five minutes after starting the ammonium persulfate addition, 750.9 g of a 49.5% aqueous solution of acrylamide is added to the reaction mixture over a period of 120 minutes. The reaction is held at 100° C. for 180 minutes after ammonium persulfate addition. The reaction mixture is then cooled to ambient temperature and the pH is adjusted to 5.2 to 5.8 using 50% aqueous sodium hydroxide solution or concentrated sulfuric acid. The product is a viscous, clear to amber solution. The product has a molecular weight of about 20,000 g/mole.

Example 2

Glyoxylation of 95/5 Mole % Acrylamide/DADMAC Copolymer with 0.8 to 1 Glyoxal to Acrylamide Mole Ratio at 9.0% Actives (Total Glyoxal and Polymer)

To a 2000-mL reaction flask fitted with a mechanical stirrer, thermocouple, condenser, addition port and sampling valve at the bottom of the reactor is added 238.0 g of a 41% aqueous solution of 95/5 mole % acrylamide/DADMAC copolymer, prepared as in Example 1, and 1304.0 g of deionized or soft water. The polymer solution is stirred at 400 rpm. The pH of the solution is adjusted to 8.8 to 9.1 by adding 5.8 g of 50% aqueous sodium hydroxide solution. The reaction temperature is set at 24 to 26° C. Glyoxal (143.0 g of a 40% aqueous solution) is added to the reaction mixture over 20 to 30 minutes. The Brookfield viscosity (Brookfield Programmable LVDV-II+ Viscometer, LV # 1 spindle at 60 rpm, Brookfield Engineering Laboratories, Inc, Middleboro, Mass.) of the reaction mixture is about 4 to 5 cps after glyoxal addition. The pH of the reaction mixture is adjusted to 7.5 to 8.8 using 10% aqueous sodium hydroxide (25 g) added over 20 to 30 minutes. The Brookfield viscosity (Brookfield Programmable LVDV-II+ Viscometer, LV # 1 spindle at 60 rpm, Brookfield Engineering Laboratories, Inc, Middleboro, Mass.) of the reaction mixture is about 4 to 5 cps after sodium hydroxide addition. The pH of the reaction mixture is maintained at about 7.0 to 8.8 at about 24 to 26° C. with good mixing. The Brookfield viscosity is monitored and upon achieving the desired viscosity increase of greater than or equal to 1 cps (5 to 200 cps, >100,000 g/mole) the pH of the reaction mixture is decreased to 2 to 3.5 by adding sulfuric acid (93%) to substantially decrease the reaction rate. The rate of viscosity increase is dependent on the reaction pH and temperature. The higher the pH of the reaction mixture the faster the rate of viscosity increase. The rate of viscosity increase is controlled by decreasing the pH of the reaction mixture. The product is a clear to hazy, colorless to amber, fluid with a Brookfield viscosity greater than or equal to 5 cps. The resulting product is more stable upon storage when the Brookfield viscosity of the product is less than 40 cps and when the product is diluted with water to lower percent actives. The product can be prepared at higher or lower percent total actives by adjusting the desired target product viscosity. NMR analysis of the samples prepared indicate that about 70 to 80% of the glyoxal is unreacted and 15 to 35 mole percent of the acrylamide units reacted with glyoxal to form monoreacted and direacted acrylamide.

Example 3

Dewatering Effectiveness of Representative Aldehyde-Functionalized Polymers

The dewatering effects of glyoxalated DADMAC/Acrylamide polymers prepared with glyoxal to acrylamide mole ratios (here after referred to as the G/A ratio) of 0.1, 0.2, 0.4 and 0.8 are evaluated through paper machine trials. The relative performance of polymers prepared using the 0.1, 0.2, and 0.8 G/A ratios are compared to the polymer prepared with the 0.4 mole ratio. The trials are run on a dual headbox Fourdrinier papermachine using 100% OCC furnish manufacturing recycle linerboard and corrugating medium. Actual papermachine conditions varied depending on the specific grade of paperboard being made. In all cases, a retention program of polyaluminum chloride fed to the thick stock and a cationic flocculant fed to the thin stock is used. For linerboard grades, ASA sizing fed to the thin stock is also present. The glyoxalated acrylamide polymers are applied through a spray boom to the underside of the top ply prior to meshing with the bottom ply, although earlier trials demonstrated the dewatering effect could also be achieved by wet-end thick or thin stock addition.

The dewatering effect of the polymers is evaluated on the basis of steam pressure changes in the machine dryer section which are provided through the mills DCS (distributive control system) computer system. The sheet moisture at the reel is measured on-line and is maintained by adjustment of the steam pressure (a measure of steam usage or energy consumption). Lower sheet moisture at the reel reflects a lower sheet moisture going into the dryer section or equivalently, better dewatering through the machine sections preceding the dryer section. The lower steam demand, as measured by pressure, then reflects improved dewatering. If the steam pressure in these sections drops to a level where the operator feels comfortable that normal swings in steam demand can be handled, then he will increase the machine speed manually. When changes in polymer type or dose are made, the steam pressure from one of the steam sections is followed closely to see if any change occurs, with proper consideration given to changes in production rates when they occur. The initial effect of a drier sheet is observed by lower percent moisture detected at the reel. However, this drop in percent moisture is short lived because of the automatic regulation leaving only the steam reduction as a permanent reminder of any dewatering effect produced. Many factors other than addition of the aldehyde-functionalized polymer also affect the sheet moisture, but most, like stock changes, occur over a longer time frame than the steam reduction effect caused by the polymer additive, particularly when applied on the table through spray application. Consequently, the steam reduction is a better indicator of polymer dewatering than the average production rate or machine speed, as these measures are more easily confounded with the other factors which effect machine speed.

Example 3a

Comparison of Polymer with a 0.1 G/A Ratio with Polymer Having a 0.4 G/A Ratio

Comparison of these two polymers is conducted on 42 lb linerboard in the absence of wet-end starch. After a baseline is established with the 0.4 G/A ratio polymer at 2.0 lb/ton, the 0.1 G/A ratio polymer is substituted at 2.2 lb/ton. Almost immediately, the sheet at the reel is consistently observed to be wetter and the steam demand increases to maximum in about 1 hr which necessitates the re-introduction of the 0.4 G/A ratio polymer to prevent slowing down the paper machine. To regain control of the machine, 3 lb/ton of the 0.4 G/A ratio polymer is needed, and its addition results in a dramatic reduction in steam pressure, 12 psi in 15 min. Subsequently, a baseline with the 0.4 G/A ratio polymer is reestablished at 2 lb/ton whereupon substitution with 0.1 G/A ratio polymer at the higher dose of 3.4 lb/ton is initiated. At this much higher dose, the steam pressure progressively increases over a period of about an hour again to the point where it becomes necessary to revert back to the 0.4 G/A ratio polymer to prevent slowing the machine. Again, with the 0.4 G/A ratio polymer added at 3.0 lb/ton the steam pressure is quickly reduced, 12 psi in 15 min. and this reduction could be maintained even when the 0.4 G/A ratio polymer's dose is reduced to 2 lb/ton. The 0.1 G/A ratio polymer could not maintain the steam pressure, and therefore the machine speed, achieved by 0.4 G/A ratio polymer even at a dose 70% higher. No change in the strength specifications for this grade (Mullen and Scott bond) could be detected when the 0.1 G/A ratio polymer is substituted for the 0.4 G/A ratio polymer.

Example 3b

Comparison of Polymer with a 0.2 G/A Ratio with Polymer Having a 0.4 G/A Ratio

Comparison of these two polymers is conducted on 35 lb linerboard with 5 lb/ton wet-end starch fed to the thick stock. After a baseline is established with the 0.4 G/A ratio polymer at 2.0 lb/ton, the 0.2 G/A ratio polymer is substituted at 2.2 lb/ton. At this dosage, a modest increase in steam pressure of 5 psi is measured over a period of about the hour. Reintroduction of the 0.4 G/A ratio polymer resulted in an immediate decrease in reel moisture and a quick decline in steam pressure of 3 psi in 10 min. Switching back to the 0.2 G/A ratio polymer at 2.2 lb/ton at this point keeps the steam reasonably constant for about an hour with only a 2 psi increase. Again, reintroduction of 2 lb of the 0.4 G/A ratio polymer results in a quick decline in steam pressure of 8 psi in 20 min. indicative of improve dewatering. Based on these results, the 0.2 G/A ratio polymer certainly demonstrates dewatering ability, but even at a 10% increase in dosage, it could not maintain the pressure achievable with the 0.4 G/A ratio polymer. Additionally, unlike the 0.1 G/A ratio polymer, the 0.2 G/A ratio polymer is capable of keeping the machine running at the desired speed although at increased steam demand and dosage relative to the 0.4 G/A ratio polymer. The trial results with these three polymers indicated that the 0.4 G/A ratio polymer gives better dewatering than the 0.2 G/A ratio polymer and it in turn gives better dewatering than the 0.1 G/A ratio polymer. No change in the strength specifications for this grade (STFI) could be detected when the 0.2 G/A ratio polymer is substituted for the 0.4 G/A ratio polymer.

Example 3c

Comparison of Polymer with a 0.8 G/A Ratio with Polymer Having a 0.4 G/A Ratio

Based on the discovery that increasing the G/A ratio in the preparation of the polymers increases dewatering, an even higher G/A ratio of 0.8 is prepared and evaluated on the same papermachine. Comparison of the 0.8 G/A ratio polymer with the 0.4 G/A ratio polymer is conducted on 33 lb corrugating medium in the absence of wet-end starch. Addition of the 0.4 G/A ratio polymer at 2.0 lb/ton results in a very good reduction in steam pressure of 21 psi after about 2 hours at which time 1.5 lb/ton of the 0.8 G/A ratio polymer replaces the 2 lb/ton of 0.4 G/A ratio polymer. Even with the 25% reduction in dose, the addition of the 0.8 G/A ratio polymer results in an even further reduction in steam pressure by 3 psi and a dramatic increase in steam pressure of 12 psi occurs in 0.5 hour when it is removed. Further trialing is conducted on 26 lb corrugating medium in the absence of wet-end starch. Starting again with 2.0 lb/ton of 0.4 G/A ratio polymer to establish the baseline, a substitution of 2.0 lb/ton of 0.8 G/A ratio polymer results in a drop in steam pressure of 7 psi in 60 min., which further decreases by 4 psi when the dosage is increased to 3 lb/ton in 10 min. Reducing the 0.8 G/A ratio polymer to only 1.0 lb/ton relative to the 3 lb/ton results in an increase in steam pressure, but it remains 8 psi below the 2.0 lb/ton 0.4 G/A ratio polymer value even with an increase in machine speed of 30 ft/min. Based on these trial results the 0.8 G/A ratio polymer appears to yield equivalent dewatering at a dose 25 to 50% less than required by the 0.4 G/A ratio polymer. The strength specification for both medium grades (Concorra) made with the 0.8 G/A ratio polymer exhibit values equal to or greater than those obtained with for the 0.4 G/A ratio polymer even though the dosages are generally lower.

Based on these trial results, increasing the G/A ratio in the preparation of the aldehyde-functionalized polymers is found to provide increased dewatering activity with the preferred ratio being greater than 0.4.

Changes can be made in the composition, operation and arrangement of the method of the invention described herein without departing from the concept and scope of the invention as defined in the claims.

The invention claimed is:

1. A composition comprising: (i) one or more aldehyde-functionalized polymers comprising amino and/or amido groups wherein at least about 15 mole percent of the amino and/or amido groups are functionalized by reacting with one or more aldehydes and (ii) at least about [60] *70 to 80* mole percent of the one or more aldehydes remain unreacted, *wherein the amount of unreacted aldehyde is based on an amount used to functionalize the amino or amido groups*.

2. The composition of claim 1, wherein the aldehyde-functionalized polymers are selected from the group consisting of: one or more aldehyde-functionalized polyamines; one or more aldehyde-functionalized polyamides; and combinations thereof.

3. The composition of claim 2, wherein the aldehyde-functionalized polyamide is selected from the group consisting of: an aldehyde-functionalized polymer comprising 100 mole percent of one or more nonionic monomers; an aldehyde-functionalized copolymer comprising about 5 to about 99 mole percent of one or more acrylamide monomers and about 95 mole percent to about 1 mole percent of one or more cationic, anionic, or zwitterionic monomers, or any mixture thereof; and any combinations of the foregoing.

4. The composition of claim 1, wherein the aldehyde-functionalized polymer is an aldehyde-functionalized amphoteric polymer comprising up to about 40 mole percent of one or more cationic monomers and up to about 20 mole percent of one or more anionic monomers.

5. The composition of claim 1, wherein the aldehyde-functionalized polymer is an aldehyde-functionalized amphoteric polymer comprising about 5 to about 10 mole percent of one or more cationic monomers and about 0.5 to about 4 mole percent of one or more anionic monomers.

6. The composition of claim 1, wherein the aldehyde-functionalized polymer is an aldehyde-functionalized zwitterionic polymer comprising about 1 to about 95 mole percent of one or more zwitterionic monomers.

7. The composition of claim 1, wherein the aldehyde-functionalized polymer is an aldehyde-functionalized zwitterionic polymer comprising about 1 to about 50 mole percent of one or more zwitterionic monomers.

8. The composition of claim 1, wherein the aldehyde-functionalized polymer is an aldehyde-functionalized copolymer comprising about 50 to about 99 mole percent of one or more acrylamide monomers and about 50 to about 1 mole percent of one or more cationic monomers.

9. The composition of claim 8, wherein at least about 20 mole percent of the amide groups have reacted with aldehyde.

10. The composition of claim 1, wherein the aldehyde-functionalized polymer is a copolymer comprising about 50 to about 99 mole percent of one or more acrylamide monomers and about 50 to about 1 mole percent of one or more cationic monomers wherein the copolymer is functionalized with glyoxal.

11. The composition of claim 10, wherein the cationic monomer is a diallyl-N,N-disubstituted ammonium halide monomer.

12. The composition of claim 11, wherein about 20 to about 50 mole percent of the amide groups of the copolymer have reacted with glyoxal.

[13. The composition of claim 1, wherein at least 60 mole percent of the one or more aldehydes remain unreacted.]

14. The composition of claim 1, wherein the aldehyde-functionalized polymer has a molecular weight of at least 100,000 g/mole.

15. The composition of claim 1, wherein the aldehyde-functionalized polymer is a copolymer comprising about 70 to about 99 mole percent of acrylamide and about 1 to about 30 mole percent of diallyldimethylammonium chloride.

16. The composition of claim 1, wherein about 20 to about 26 mole percent of the amino and/or amide groups of the copolymer have reacted with aldehyde.

17. The composition of claim 1, wherein the aldehydes are selected from the group consisting of: formaldehyde; paraformaldehyde; glyoxal; glutaraldehyde; and combinations thereof.

18. The composition of claim 1, wherein from about 15 mole percent to 23 mole percent of the amino and/or amido groups are functionalized.

19. The composition of claim 1, wherein from about 20 mole percent to 26 mole percent of the amino and/or amido groups are functionalized.

20. The composition of claim 1, wherein from about 22 mole percent to 30 mole percent of the amino and/or amido groups are functionalized.

21. The composition of claim 1, wherein from about 20 mole percent to about 50 mole percent of the amino and/or amido groups are functionalized.

[22. The composition of claim 1, wherein from about 60 mole percent to 70 mole percent of the one or more aldehydes remain unreacted.]

[23. The composition of claim 1, wherein from about 70 mole percent to 80 mole percent of the one or more aldehydes remain unreacted.]

24. A method of enhancing the dewatering of a paper sheet on a paper machine, the method comprising adding about 0.05 lb/ton to about 15 lb/ton, based on dry fiber, of the composition of claim 1 to the paper machine.

25. The method of claim [25] *24*, further comprising adding said composition to (i) wet end locations used for conventional wet end additives and/or (ii) at or prior to the press section.

26. The method of claim 24, further comprising spraying said composition onto the paper sheet prior to press dewatering.

27. The method of claim 24, wherein about 0.5 lb/ton to about 3 lb/ton, based on dry fiber, of said composition is added to the paper machine.

28. A method of enhancing a papermaking process, the method comprising adding the composition of claim 1 in the papermaking process.

29. The method of claim 28, further comprising adding said composition in the papermaking process at a wet end location.

30. The method of claim 28, further comprising adding said composition to a thin stock in the papermaking process.

31. The method of claim 28, further comprising adding said composition to a thick stock in the papermaking process.

32. The method of claim 28, further comprising adding said composition in the papermaking process after formation of a paper sheet.

33. The method of claim 28, further comprising adding said composition in the papermaking process prior to press dewatering.

34. The method of claim 28, further comprising adding about 0.05 lb/ton to about 15 lb/ton, based on dry fiber, of said composition in the papermaking process.

*35. A composition comprising one or more aldehyde-functionalized polymers comprising amino and/or amido groups,*

*the amino and/or amido groups are functionalized by reacting with one or more aldehydes with the initial molar ratio of the aldehydes to amino and/or amido groups being 0.8 to 1.0, wherein at least about 70 to 80 mole percent of the one or more aldehydes remain unreacted and the amount of unreacted aldehyde is based on an amount used to functionalize the amino or amido groups.*

*36. The composition of claim 35, wherein the aldehyde-functionalized polymers are selected from the group consisting of: one or more aldehyde-functionalized polyamines; one or more aldehyde-functionalized polyamides; and combinations thereof.*

*37. The composition of claim 35, wherein the aldehyde-functionalized polymer is an aldehyde-functionalized amphoteric polymer comprising up to about 40 mole percent of one or more cationic monomers and up to about 20 mole percent of one or more anionic monomers.*

*38. The composition of claim 35, wherein the aldehyde-functionalized polymer is an aldehyde-functionalized zwitterionic polymer comprising about 1 to about 95 mole percent of one or more zwitterionic monomers.*

*39. The composition of claim 35, wherein at least about 20 mole percent of the amino and/or amido groups have reacted with aldehyde.*

*40. The composition of claim 35, wherein the aldehyde-functionalized polymer has a molecular weight of at least 100,000 g/mole.*

*41. The composition of claim 35, wherein the aldehydes are selected from the group consisting of: formaldehyde; paraformaldehyde; glyoxal; glutaraldehyde; and combinations thereof.*

*42. The composition of claim 35, wherein from about 22 mole percent to 30 mole percent of the amino and/or amido groups are functionalized.*

*43. A method of enhancing the dewatering of a paper sheet on a paper machine, the method comprising adding about 0.05 lb/ton to about 15 lb/ton, based on dry fiber, of the composition of claim 35 to the paper machine.*

*44. The method of claim 43, further comprising adding said composition to (i) wet end locations used for conventional wet end additives and/or (ii) at or prior to the press section.*

*45. The method of claim 43, further comprising spraying said composition onto the paper sheet prior to press dewatering.*

*46. The method of claim 43, wherein about 0.5 lb/ton to about 3 lb/ton, based on dry fiber, of said composition is added to the paper machine.*

*47. A method of enhancing a papermaking process; the method comprising adding the composition of claim 35 in the papermaking process.*

*48. The method of claim 47, further comprising adding said composition in the papermaking process at a wet end location.*

*49. The method of claim 47, further comprising adding said composition to a thin stock in the papermaking process.*

*50. The method of claim 47, further comprising adding said composition to a thick stock in the papermaking process.*

*51. The method of claim 47, further comprising adding said composition in the papermaking process after formation of a paper sheet.*

*52. The method of claim 47, further comprising adding said composition in the papermaking process prior to press dewatering.*

*53. A composition comprising: (i) one or more aldehyde-functionalized polymers comprising amino and/or amido groups wherein from 22 mole percent to 30 mole percent of the amino and/or amido groups are functionalized by reacting with one or more aldehydes and (ii) at least about 70 to 80 mole percent of the one or more aldehydes remain unreacted, wherein the amount of unreacted aldehyde is based on an amount used to functionalize the amino or amido groups.*

* * * * *